US011372470B2

United States Patent
Chen et al.

(10) Patent No.: US 11,372,470 B2
(45) Date of Patent: Jun. 28, 2022

(54) CONTROL SYSTEM FOR CONTROLLING INTELLIGENT SYSTEM TO REDUCE POWER CONSUMPTION BASED ON BLUETOOTH DEVICE

(71) Applicant: AMLOGIC (SHANGHAI) CO., LTD, Shanghai (CN)

(72) Inventors: Siwei Chen, Shanghai (CN); Kun Zhang, Shanghai (CN)

( * ) Notice: Subject to any disclaimer, the term of this patent is extended or adjusted under 35 U.S.C. 154(b) by 495 days.

(21) Appl. No.: 16/342,093

(22) PCT Filed: Oct. 31, 2018

(86) PCT No.: PCT/CN2018/113146
§ 371 (c)(1),
(2) Date: Apr. 15, 2019

(87) PCT Pub. No.: WO2019/119983
PCT Pub. Date: Jun. 27, 2019

(65) Prior Publication Data
US 2021/0365101 A1 Nov. 25, 2021

(30) Foreign Application Priority Data
Dec. 19, 2017 (CN) .......................... 201711378879.3

(51) Int. Cl.
*G06F 1/3287* (2019.01)
*G05B 19/042* (2006.01)
*G06F 1/3209* (2019.01)

(52) U.S. Cl.
CPC ....... *G06F 1/3287* (2013.01); *G05B 19/0425* (2013.01); *G06F 1/3209* (2013.01); *G05B 2219/2612* (2013.01)

(58) Field of Classification Search
CPC . G06F 1/3287; G06F 1/3209; G05B 19/0425; G05B 2219/2612
(Continued)

(56) References Cited

U.S. PATENT DOCUMENTS 8,661,278 B2 * 2/2014 Lefebvre ............... G06F 1/3287
713/323
8,830,889 B2 9/2014 Woo et al.
(Continued)

FOREIGN PATENT DOCUMENTS

CN 201562357 U 8/2010
CN 204795336 * 11/2015
(Continued)

*Primary Examiner* — Chun Cao
(74) *Attorney, Agent, or Firm* — Clement Cheng

(57) ABSTRACT

The invention provides a control system for controlling an intelligent system to reduce the power consumption based on a Bluetooth device, comprising: a main control chip; the Bluetooth device connected with the main control chip; a controller connected with the Bluetooth device and the main control chip, respectively, wherein the controller is connected with a power supply and is used for controlling the on and off of the power supply circuit of the control chip; and an isolation circuit connected among the Bluetooth device, main control chip and the controller, when the controller controls the power supply circuit to be switched off, the isolation circuit enables the Bluetooth device at an enabled state. The issues, that the cost is increased due to the fact that the single-chip microcomputer is additionally arranged to realize Bluetooth wake-up and the overall power consumption of the intelligent system is high, are overcome.

9 Claims, 3 Drawing Sheets

(58) Field of Classification Search
USPC .......................................................... 713/320
See application file for complete search history.

(56) References Cited

U.S. PATENT DOCUMENTS

| | | | |
|---|---|---|---|
| 9,125,158 B2* | 9/2015 | Ly-Gagnon | H04W 52/0225 |
| 2002/0023237 A1* | 2/2002 | Yamada | G06F 1/3209 |
| | | | 713/323 |
| 2012/0214417 A1* | 8/2012 | Woo | G06F 1/3209 |
| | | | 455/41.2 |
| 2020/0359318 A1* | 11/2020 | Lu | H04W 52/0261 |

FOREIGN PATENT DOCUMENTS

| | | |
|---|---|---|
| CN | 204795336 U | 11/2015 |
| CN | 205791612 U | 12/2016 |
| CN | 107402537 A | 11/2017 |

* cited by examiner even the cumulative power consumption has been able to reach and meet the certification requirement of below 0.5 W, it is very slightly below the certification requirement, a single-chip microcomputer is required.

CONTROL SYSTEM FOR CONTROLLING INTELLIGENT SYSTEM TO REDUCE POWER CONSUMPTION BASED ON BLUETOOTH DEVICE

CROSS-REFERENCE TO RELATED APPLICATIONS

The present application is a national phase of Ser. No. PCT/CN2018/113146 filed Oct. 31, 2018, the entire contents of which are incorporated hereto by reference, and which claims priority to and the benefit of Chinese Patent Application No. 201711378879.3 filed Dec. 19, 2017.

BACKGROUND OF THE INVENTION

1. Field of the Invention

The invention relates to the field of communication technologies, and more particularly, to a control system for controlling an intelligent system to reduce the power consumption based on a Bluetooth device.

2. Description of the Related Art

The Bluetooth wake-up function refers to a function operating in the following way: when a main control chip is in an off state, a Bluetooth device is in an enabled state, and the Bluetooth device wakes up the main control chip for system processing upon receiving an external signal. The Bluetooth wake-up function in the prior art is mainly implemented in the following ways. A WIFI&BT module is controlled by making the main control chip enter into standby mode or by adding a single-chip microcomputer.

As shown in FIG. 1, for a solution of making the main control chip enter into standby mode, although extra costs are not increased in terms of circuits, the overall power consumption is increased. The system power supply of the main control chip cannot be turned off during a shutdown process, since the main control chip enables WIFI_PWREN and BT_EN ports of the Bluetooth device (WIFI&BT module) during the shutdown process. The overall power consumption comprises the power consumption of the main control chip, the power consumption of the WIFI&BT module and an adapter. To be specific, the main control chip has a standby power consumption of about 0.2 W, the WIFI&BT module has a standby power consumption of about 0.2 W, and the adapter has a power consumption of about 0.2 W. In this case, the overall power consumption will be about 0.6 W, which does not meet the certification requirement that the standby power consumption should below 0.5 W.

The other method is about arranging a single-chip microcomputer (Microcontroller Unit, MCU)). As shown in FIG. 2, when the system is shut down, the system power supply of the main control chip is controlled by the single-chip microcomputer, and the WIFI_PWREN and the BT_EN ports of the WIFI&BT module are enabled by the single-chip microcomputer.

The standby power consumption of the single-chip microcomputer is negligible because it is at the microwatt level. The overall power consumption comprises the power consumption of the WIFI&BT module and the adapter. To be specific, the WIFI&BT module has a standby power consumption of about 0.2 W, and the adapter has a power consumption of about 0.2 W. Then the overall power consumption will be 0.4 W, which meets the certification requirement that the standby power consumption should below 0.5 W. However, the single-chip microcomputer and a crystal circuit should be additionally arranged in the circuitry, which in turn increases circuit costs.

SUMMARY OF THE INVENTION

With respect to the foregoing problems in the Bluetooth wake-up in the prior art, the present invention provides a control system, which aims to effectively reduce the power consumption, and to overcome the problem that the cost is increased due to the fact that a single-chip microcomputer is additionally arranged in the prior art to realize Bluetooth weak-up.

The technical solutions are as follows:

A control system for controlling an intelligent system to reduce the power consumption based on a Bluetooth device, comprising:
a main control chip of the intelligent system;
the Bluetooth device connected with the main control chip;
a controller connected with the Bluetooth device and the main control chip, respectively, wherein the controller is connected with a power supply and is used for controlling the on and off of a power supply circuit of the main control chip; and
an isolation circuit connected among the Bluetooth device, main control chip and the controller, when the controller controls the power supply circuit of the main control chip to be switched off, the isolation circuit enables the Bluetooth device at an enabled state.

Preferably, the Bluetooth device comprises a Bluetooth unit and a WIFI unit.

Preferably, the isolation circuit is connected between the Bluetooth unit and the main control chip and between the WiFi unit and the main control chip, respectively.

Preferably, the isolation circuit is a triode, the triode comprising a base, a collector and an emitter;
wherein the base is connected with a pin of the main control chip, and is provided with a base resistor;
the collector is connected with the controller, the collector is also connected with a pin of the Bluetooth device, and a collector resistor is disposed between the collector and the controller; and
the emitter is grounded.

Preferably, the base resistor and/or the collector resistor have a resistance of 10K.

Preferably, the controller and the Bluetooth device are connected through a data line;
wherein the controller comprises:
a DC-DC converter, one end of which is connected with the power supply unit and the other end of which is connected with the isolation electrical circuit and the Bluetooth device;
a control switch connected with the power supply unit, the Bluetooth device and the power supply circuit of the main control chip, respectively;
the control switch is configured to be disconnected from the power supply circuit of the main control chip according to a shutdown signal output by the Bluetooth device, and to form a closed circuit between the control switch and the power supply circuit of the main control chip according to a wake-up signal output by the Bluetooth device.

Preferably, the control switch is a MOS transistor.

Preferably, the main control chip and the Bluetooth device are connected through data transmission lines.

Preferably, the data transmission lines comprise a USB data line and a data line based on an SDIO interface.

The above-mentioned technical solutions have the following advantages. By arranging an isolation circuit, a Bluetooth device is still in an enabled state when a main control chip is in an off state, and the Bluetooth device may wake up the main control chip upon receiving an external wake-up signal, that is, a closed circuit is formed between the power supply circuit of the main control chip and the power supply. In this way, the problems that the cost is increased due to the fact that the single-chip microcomputer is additionally arranged in the prior art to realize Bluetooth weak-up and the overall power consumption of the intelligent system is high are overcome.

BRIEF DESCRIPTION OF THE DRAWINGS

The accompanying drawings, together with the specification, illustrate exemplary embodiments of the present disclosure, and, together with the description, serve to explain the principles of the present invention.

DETAILED DESCRIPTION

Figure 1:
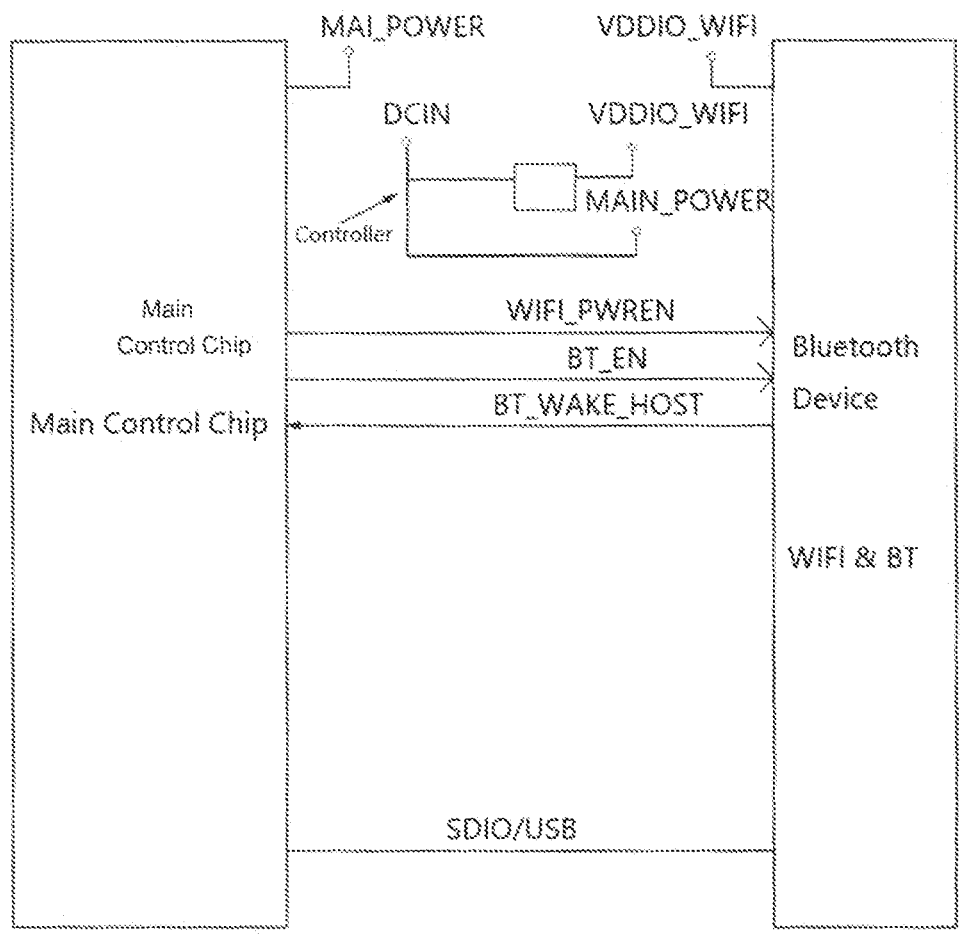
FIG. 1 is a depiction of the prior art, illustrating a structural diagram of a first implementation of Bluetooth wake-up.
Figure 2:
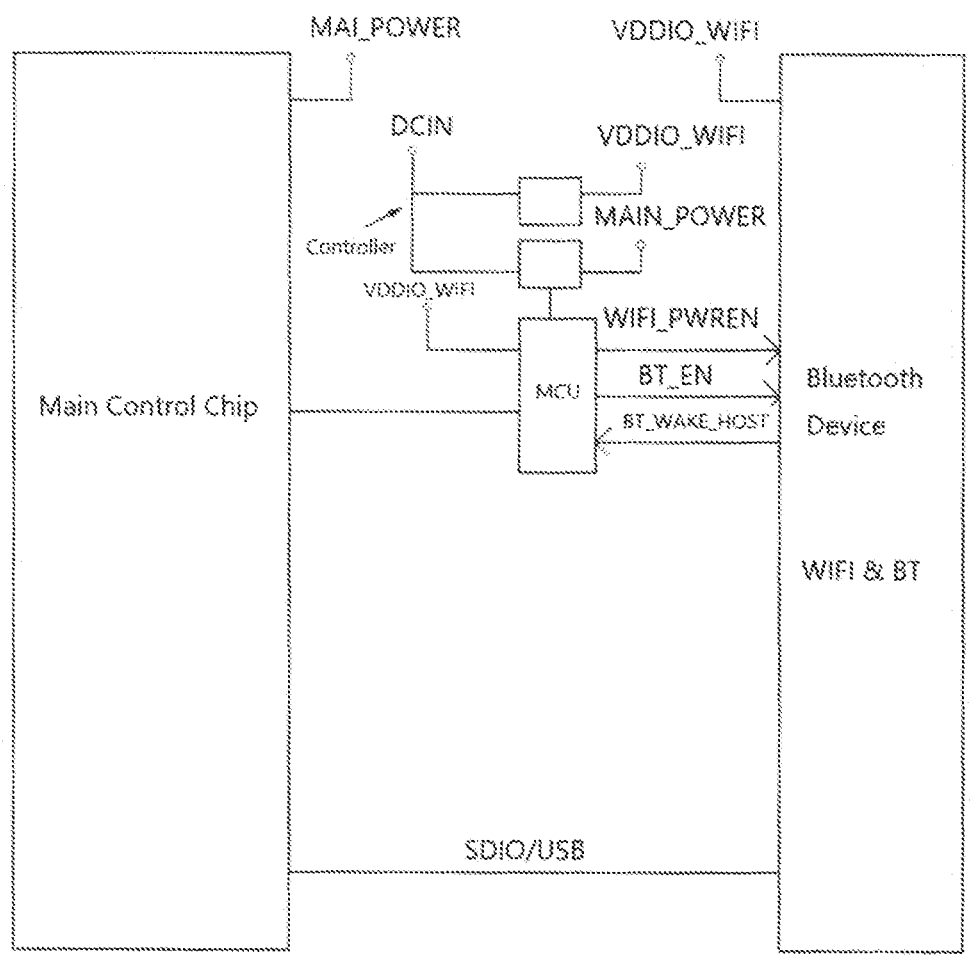
FIG. 2 is a depiction of the prior art, illustrating a structural diagram of a second implementation of Bluetooth wake-up.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the term "plurality" means a number greater than one.

Hereinafter, certain exemplary embodiments according to the present disclosure will be described with reference to the accompanying drawings.

The technical solutions set forth in the present invention comprise a control system for controlling an intelligent system to reduce the power consumption based on a Bluetooth device.

Figure 3:
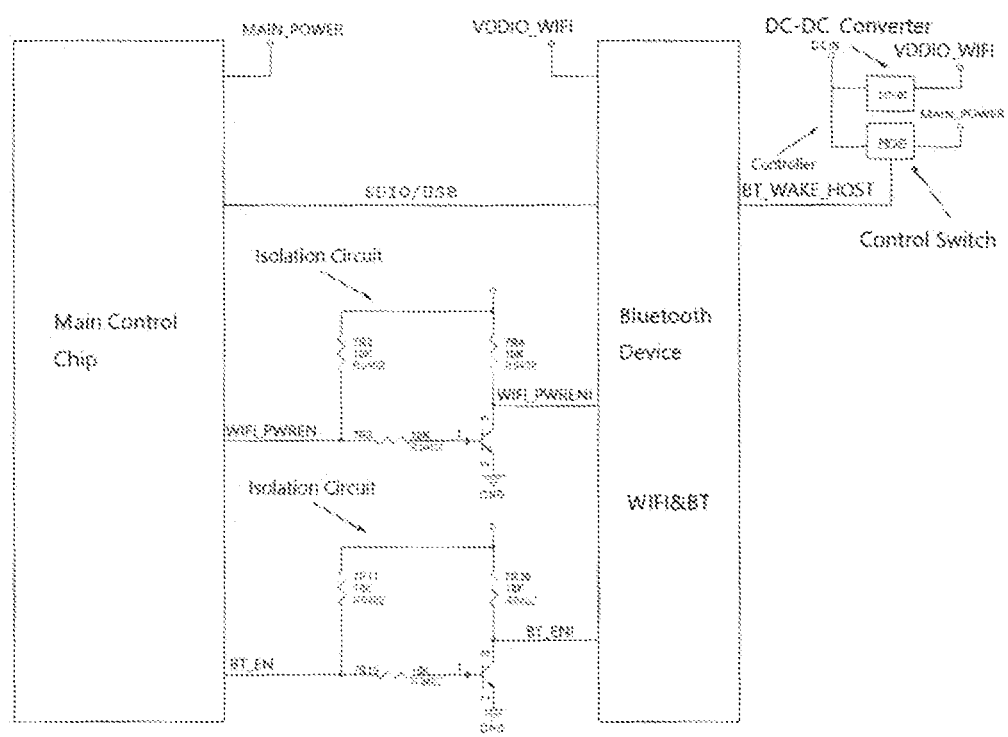
FIG. 3 is a schematic structural diagram of a control system for controlling an intelligent system to reduce the power consumption based on a Bluetooth device according to the present invention.

As shown in FIG. 3, a control system for controlling an intelligent system to reduce the power consumption based on a Bluetooth device, comprising:

a main control chip of the intelligent system;

the Bluetooth device connected with the main control chip;

a controller connected with the Bluetooth device and the main control chip, respectively, wherein the controller is connected with a power supply and is used for controlling the on and off of a power supply circuit of the main control chip; and an isolation circuit connected among the Bluetooth device, main control chip and the controller, when the controller controls the power supply circuit of the main control chip to be switched off, the isolation circuit enables the Bluetooth device at an enabled state.

With respect to the problem that the power consumption of the main control chip is high when the main control chip is in standby mode, specifically, the power consumption of 0.2 W will be additionally increased in order to keep the main control chip on state, and the increased power consumption of 0.2 W may reduce the standby time for battery-driven devices.

For example, if the battery capacity is 4000 mAh/7.6V, the power consumption time for the additional power consumption of 0.2 W=(4000 mAh*7.6V/1000)/0.2 W=152 h, that is to say, the power consumption time for power consumption of 0.2 W is 152 h (i.e., about 6.3 days). Thus, by reducing power consumption of 0.2 W, the standby time of the battery-driven device can be increased by 6.3 days.

With respect to the other method, the single-chip microcomputer is additionally arranged in the prior art to realize Bluetooth wake-up. However, adding the single-chip microcomputer may increase the circuit design cost.

In the present invention, by arranging an isolation circuit between the main control chip and the Bluetooth device, after the system controls the main control chip to be powered off, one end of the isolation circuit at which the Bluetooth device is connected with is maintained at a high level to make the Bluetooth device at the enable status. After the Bluetooth device receives a wake-up signal, the wake-up signal will be output to the controller, and the controller controls the power supply to electrically connect with the power supply circuit of the main control chip, so that the main control chip is woken up.

In the above-mentioned technical solution, the overall power consumption in the shutdown process comprises the power consumption of the Bluetooth device and the controller. To be specific, the Bluetooth device has a standby power consumption of about 0.2 W, and the controller has a power consumption of about 0.2 W. Then the overall power consumption will be about 0.4 W, which meets the certification requirement that the standby power consumption should below 0.5 W. Thus, low cost and low power consumption can be achieved.

In a preferred embodiment, the Bluetooth device comprises a Bluetooth unit and a WIFI unit.

In a preferred embodiment, the isolation circuit is connected between the Bluetooth unit and the main control chip and between the WiFi unit and the main control chip, respectively.

In a preferred embodiment, the isolation circuit arranged between the WiFi unit and the main control chip is a triode, the triode comprising a base, a collector and an emitter;

wherein the base is connected with a pin of the main control chip, and the collector is provided with a base resistor 7R3;

the collector is connected with the controller, the collector is also connected with a pin of the Bluetooth device, and a collector resistor 7R4 is disposed between the collector and the controller; and the emitter is grounded.

In a preferred embodiment, the isolation circuit arranged between the Bluetooth unit (BT) and the main control chip is a triode comprising a base, a collector and an emitter;

wherein the base is connected with the pin of the main control chip, and the collector is provided with a base resistor 7R19;

the collector is connected with the controller, the collector is also connected with the pin of the Bluetooth device, and a collector resistor 7R20 is disposed between the collector and the controller; and the emitter is grounded.

In the above-mentioned technical solution, after the main control chip is powered off, one end of the triode at which the main control chip is connected with is at a low level, and the isolation resistor and the base resistor act as a pull-up resistor to make the triode and the pin of the Bluetooth unit, and one end of the triode at which the WiFi is connected with are at a high level state (enabled state), so as to isolate the main control chip from the Bluetooth unit and the WiFi unit.

After the main control chip is powered on, one end of the triode at which the main control chip is connected with is at a high level state, and one end of the triode at which the pin of the Bluetooth unit is connected with, and one end of the triode at which the WIFI is connected with, are at a low level state.

In a preferred embodiment, the base resistor has a resistance of 10K.

In a preferred embodiment, the collector resistor has a resistance of 10K.

In a preferred embodiment, the controller and the Bluetooth device are connected through a data line (BT_WAKE_HOST);

wherein the controller comprises:

a DC-DC converter, one end of which is connected with the power supply unit and the other end of which is connected with the isolation electrical circuit and the Bluetooth device;

a control switch connected with the power supply unit, the Bluetooth device and the power supply circuit of the main control chip, respectively;

the control switch is configured to be disconnected from the power supply circuit of the main control chip according to a shutdown signal output by the Bluetooth device, and to form a closed circuit between the control switch and the power supply circuit according to a wake-up signal output by the Bluetooth device.

In a preferred embodiment, the control switch is a MOS transistor.

In a preferred embodiment, the main control chip and the Bluetooth device are connected through data transmission lines.

In a preferred embodiment, the data transmission lines comprise a USB data line and a data line based on an SDIO interface.

In the above-mentioned technical solutions, by arranging an isolation circuit, a Bluetooth device is still in an enabled state when a main control chip is in an off state, and the Bluetooth device may wake up the main control chip upon receiving an external wake-up signal, that is, a closed circuit is formed between the power supply circuit of the main control chip and the power supply. In this way, the problems that the cost is increased due to the fact that the single-chip microcomputer is additionally arranged in the prior art to realize Bluetooth wake-up and the overall power consumption of the intelligent system is high are overcome.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A control system for controlling an intelligent system to reduce power consumption based on a Bluetooth device, comprising:

a main control chip of the intelligent system;

the Bluetooth device connected with the main control chip;

a controller connected with the Bluetooth device and the main control chip, respectively, wherein the controller is connected with a power supply and is used for controlling an on and off of a power supply circuit of the main control chip;

an isolation circuit connected among the Bluetooth device, main control chip and the controller, when the controller controls the power supply circuit of the main control chip to be switched off, the isolation circuit enables the Bluetooth device at an enabled state, wherein the isolation circuit includes a first isolation circuit and a second isolation circuit, the first isolation circuit is a first triode, the first triode comprising a first base, a first collector and a first emitter;

wherein the first base is connected with a WI_PWREN pin of the main control chip, and is provided with a first base resistor;

the first collector is connected with the first controller, the first collector is also connected with a WIFI_PWRENI pin of the Bluetooth device, and a first collector resistor is disposed between the first collector and the controller; and the first emitter is grounded;

the second isolation circuit is a second triode, the second triode comprising, a second base, a second collector and a second emitter;

wherein the second base is connected with BT_EN pin of the main control chip, and is provided with a second base resistor;

the second collector is connected with the second controller, the second collector is also connected with a BT_ENI pin of the Bluetooth device, and a second collector resistor is disposed between the second collector and the controller; and the second emitter is grounded.

2. The control system as claimed in claim 1, wherein the Bluetooth device comprises a Bluetooth unit and a WIFI unit.

3. The control system as claimed in claim 2, wherein the isolation circuit is connected between the Bluetooth unit and the main control chip and between the WiFi unit and the main control chip, respectively.

4. The control system as claimed in claim 1, wherein the base resistor and/or the collector resistor have a resistance of 10K.

5. The control system as claimed in claim 1, wherein the base resistor and/or the collector resistor have a resistance of 10K.

6. The control system as claimed in claim 1, wherein the controller and the Bluetooth device are connected through a data line;
wherein the controller comprises:
a DC-DC converter, one end of which is connected with the power supply unit and the other end of which is connected with the isolation electrical circuit and the Bluetooth device;
a control switch connected with the power supply unit, the Bluetooth device and the power supply circuit of the main control chip, respectively;
the control switch is configured to be disconnected from the power supply circuit of the main control chip according to a shutdown signal output by the Bluetooth device, and to form a closed circuit between the control switch and the power supply circuit of the main control chip according to a wake-up signal output by the Bluetooth device.

7. The control system as claimed in claim 6, wherein the control switch is a MOS transitor.

8. The control system as claimed in claim 1, wherein the main control chip and the Bluetooth device are connected through data transmission lines.

9. The control system as claimed in claim 8, wherein the data transmission lines comprise a USB data line and a data line based on an SDIO interface.

* * * * *